US011193414B2

(12) United States Patent
Röhr et al.

(10) Patent No.: US 11,193,414 B2
(45) Date of Patent: Dec. 7, 2021

(54) EXHAUST SYSTEM AND MIXER ASSEMBLY UNIT FOR AN EXHAUST SYSTEM

(71) Applicant: Eberspächer Exhaust Technology GmbH & Co. KG, Neunkirchen (DE)

(72) Inventors: Benjamin Röhr, Esslingen (DE); Roland Schwarz, Esslingen (DE); Peter Gorke, Stuttgart (DE); Frank Berkemer, Eningen (DE); Tadeusz-Jozef Juroszek, Lichtenwald (DE)

(73) Assignee: Purem GmbH, Neunkirchen (DE)

( * ) Notice: Subject to any disclaimer, the term of this patent is extended or adjusted under 35 U.S.C. 154(b) by 346 days.

(21) Appl. No.: 16/372,848

(22) Filed: Apr. 2, 2019

(65) Prior Publication Data
US 2019/0301347 A1   Oct. 3, 2019

(30) Foreign Application Priority Data
Apr. 3, 2018   (DE) ...................... 10 2018 107 766.1

(51) Int. Cl.
| *F01N 13/18* | (2010.01) |
| *F01N 3/28* | (2006.01) |
| *F16L 23/04* | (2006.01) |
| *B01F 5/06* | (2006.01) |
| *F01N 3/20* | (2006.01) |

(52) U.S. Cl.
CPC ......... *F01N 13/185* (2013.01); *F01N 3/2892* (2013.01); *F01N 13/1872* (2013.01); *F16L 23/04* (2013.01); *B01F 5/0606* (2013.01); *B01F 5/0616* (2013.01); *F01N 3/2066* (2013.01); *F01N 2240/20* (2013.01)

(58) Field of Classification Search
CPC .. F01N 13/1872; F01N 13/185; F01N 3/2892; F01N 3/2066
USPC ......................................................... 422/176
See application file for complete search history.

(56) References Cited

U.S. PATENT DOCUMENTS

2016/0032809 A1\*   2/2016   Kobe ................... B01F 5/0616
                                                                60/324

FOREIGN PATENT DOCUMENTS

| CN | 101473115 A | 7/2009 |
| CN | 102337950 A | 2/2012 |
| DE | 26 14 477 A1 | 10/1977 |
| DE | 10 2010 034 743 A1 | 2/2012 |
| DE | 10 2011 075 252 A1 | 11/2012 |

(Continued)

*Primary Examiner* — Tom P Duong
(74) *Attorney, Agent, or Firm* — McGlew and Tuttle, P.C.

(57) ABSTRACT

An exhaust system includes a mixer assembly unit (26a) with a mixer body (48a) with an incoming flow side (58a) and with an outflow side (60a) and with a plate shaped carrier element (24a) with a radially outward carrier element body (44a). The mixer body includes a plurality of flow deflection elements (62a) and a holding area (70a). The carrier element includes a counter-holding area (46a) connected in substance to a holding area. The mixer assembly unit is arranged in a junction area of two tubular exhaust gas guide elements (14a, 16a). The exhaust gas guide elements include flange shaped coupling sections. The carrier element body is arranged between the flange shaped coupling sections of the exhaust gas guide elements. A coupling element engages the flange shaped coupling sections and extends over the coupling sections on axial sides oriented facing away from one another radially inwards.

19 Claims, 9 Drawing Sheets

(56) References Cited

FOREIGN PATENT DOCUMENTS

| | | |
|---|---|---|
| DE | 20 2012 011 764 U1 | 3/2013 |
| DE | 10 2013 201 402 A1 | 8/2013 |
| DE | 10 2014 215 083 A1 | 2/2016 |
| DE | 10 2016 120 171 A1 | 4/2018 |
| EP | 2474721 A1 | 7/2012 |
| EP | 2979750 A1 | 2/2016 |

* cited by examiner

EXHAUST SYSTEM AND MIXER ASSEMBLY UNIT FOR AN EXHAUST SYSTEM

CROSS REFERENCE TO RELATED APPLICATIONS

This application claims the benefit of priority under 35 U.S.C. § 119 of German Application 10 2018 107 766.1, filed Apr. 3, 2018, the entire contents of which are incorporated herein by reference.

TECHNICAL FIELD

The present invention pertains to an exhaust system as well as to a mixer assembly unit, which can be used in such an exhaust system of an internal combustion engine of a vehicle to mix reactant injected into the exhaust gas discharged by an internal combustion engine with the exhaust gas.

BACKGROUND

To reduce the pollutant emission especially of diesel internal combustion engines in motor vehicles, it is known that reactant, for example, a urea/water solution, is injected into the exhaust gas discharged by the internal combustion engine in order to carry out a selective catalytic reduction in a catalytic converter device integrated into the exhaust system to reduce the nitrogen oxide content in the exhaust gas. To achieve efficient mixing of the exhaust gas with the reactant injected into this in the process, a mixer, which brings about swirling of the exhaust gas flowing in the exhaust system and hence mixing with the injected reactant with a plurality of blade-like (blade shaped) flow deflection elements, is integrated into the exhaust system downstream of the reactant injection and upstream of the catalytic converter device. Such mixers are configured, in general, such that they are accommodated basically in the interior of tubular exhaust gas guide elements of the exhaust system and are carried on the exhaust system in its radially outer area.

Figure 1:
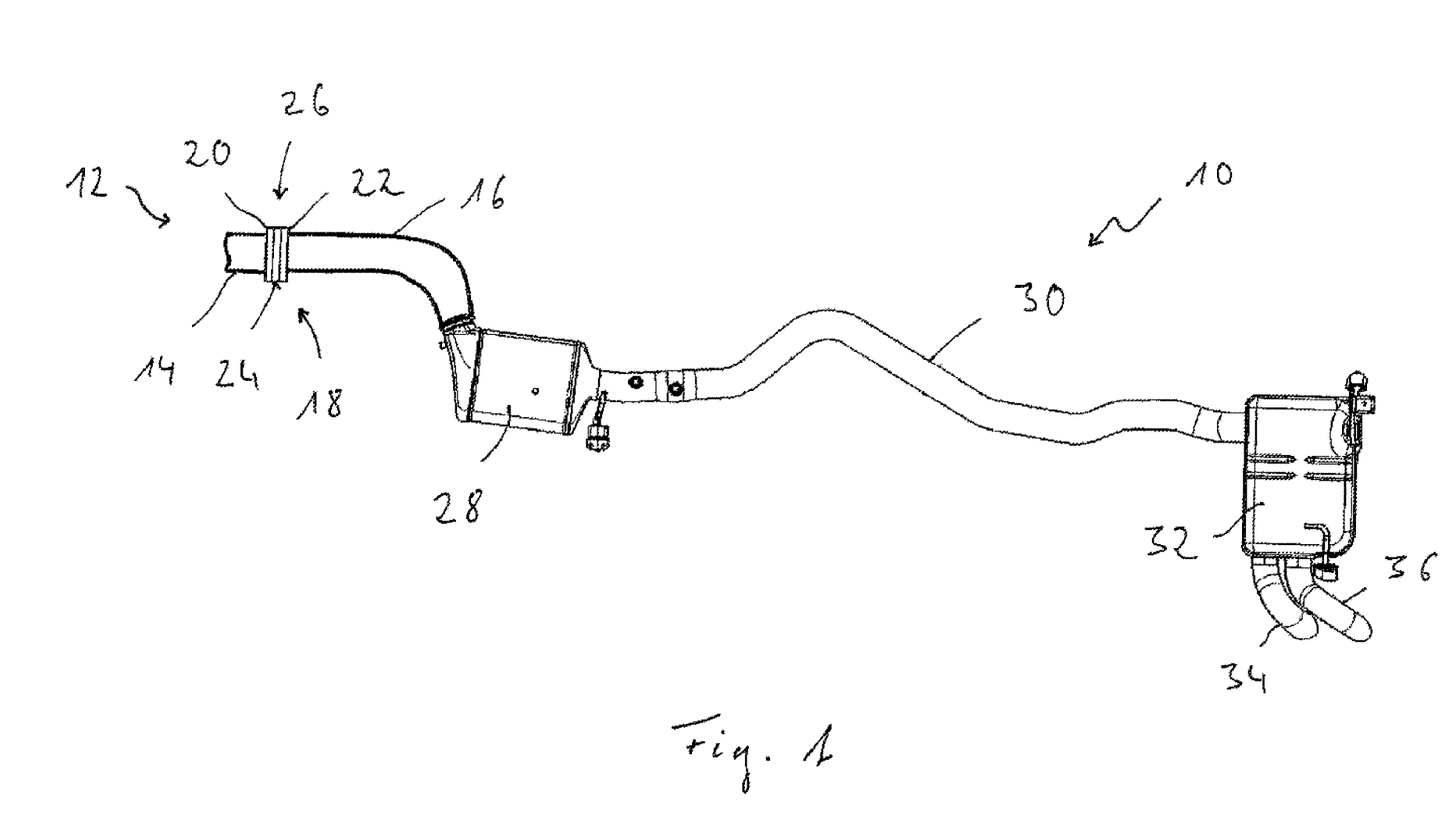
FIG. 1 is a plan view of an exhaust system of an internal combustion engine of a vehicle, which exhaust system is known from the state of the art.

An exhaust system known from the subsequently published German patent application DE 10 2016 120 171.5 for an internal combustion engine of a vehicle is generally designated by 10 in FIG. 1. The exhaust system 10 has two tubular exhaust gas guide elements 14, 16 adjoining one another in an upstream area 12. In a junction area 18, these have a respective flange-like (flange shaped) coupling section 20 and 22 each, in which these are permanently connected to one another by, for example, bolts passing through the flange shaped coupling sections 20, 22. A carrier element 24 of a mixer assembly unit, generally designated by 26, which said carrier element will be described in even more detail below, is positioned between the two flange shaped coupling areas 20, 22 and is thus fixed at the exhaust system 10 by means of the bolts, which also pass, for example, through this carrier element, with the two exhaust gas guide elements 14, 16 and with the flange shaped coupling sections 20, 22 thereof in the junction area 18.

The junction area 18 is located downstream of a reactant injection device, by means of which a reactant, for example, a urea/water solution, can be injected into the exhaust gas stream. A catalytic converter device, which is generally designated by 28 and in which the mixture of exhaust gas and reactant is subjected to a selective catalytic reduction in order thus to lower the percentage of nitrogen oxide in the exhaust gas, is provided downstream of the junction area 18, adjoining the exhaust gas guide element 16. Via an additional exhaust gas guide element 30, the exhaust gas reaches an exhaust muffler 32, from which this is released to the outside, for example, via two tail pipes 34, 36.

Figure 2:
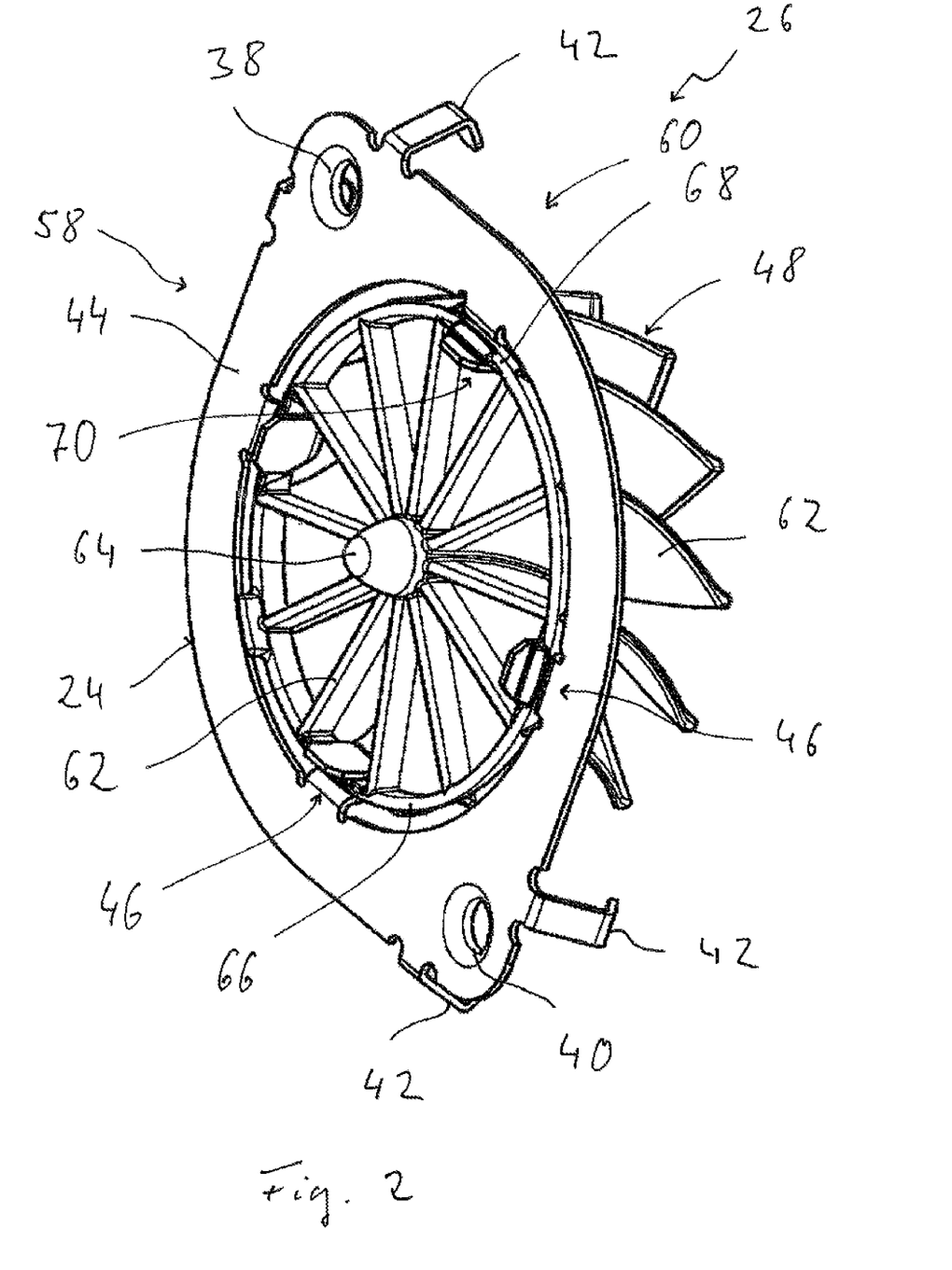
FIG. 2 is a perspective view of a mixer assembly unit of the exhaust system according to FIG. 1.

FIG. 2 shows the mixer assembly unit 26 in a perspective view. The mixer assembly unit 26 comprises the carrier element 24, which preferably has a plate-like (plate shaped) configuration and which was already mentioned and whose circumferential contour may correspond, for example, essentially to the circumferential contour of the flange shaped coupling section 22. Just like the flange shaped coupling section 22, the carrier element 24, which is preferably provided as a shaped sheet metal part and has a plate shaped configuration, is configured with a ring-like (ring shaped) structure and has, at two mutually opposite circumferential areas, radial expansions with openings 38, 40, through which the two flange shaped coupling sections 20, 22 and hence the bolts connecting the exhaust gas guide elements 14, 16 can be passed.

To make it possible to combine the carrier element 24 and the mixer assembly unit 26 as a preassembled assembly unit with the exhaust gas guide element 16, the carrier element 24 has fixing straps 42, for example, in the above-mentioned two circumferential areas, which fixing straps have such a bent shape or are bent after positioning the mixing device 26 on the exhaust gas guide element 16 such that they extend behind the flange shaped coupling section 22 and thus fix the mixer assembly unit 26 on this. The assembly unit thus composed can then be assembled with the exhaust gas guide element 14 in a simple manner by the flange shaped coupling section of said exhaust gas guide element being joined to the flange shaped coupling section 22 and to the carrier element 24 and being connected thereto by a screw connection.

Figure 3:
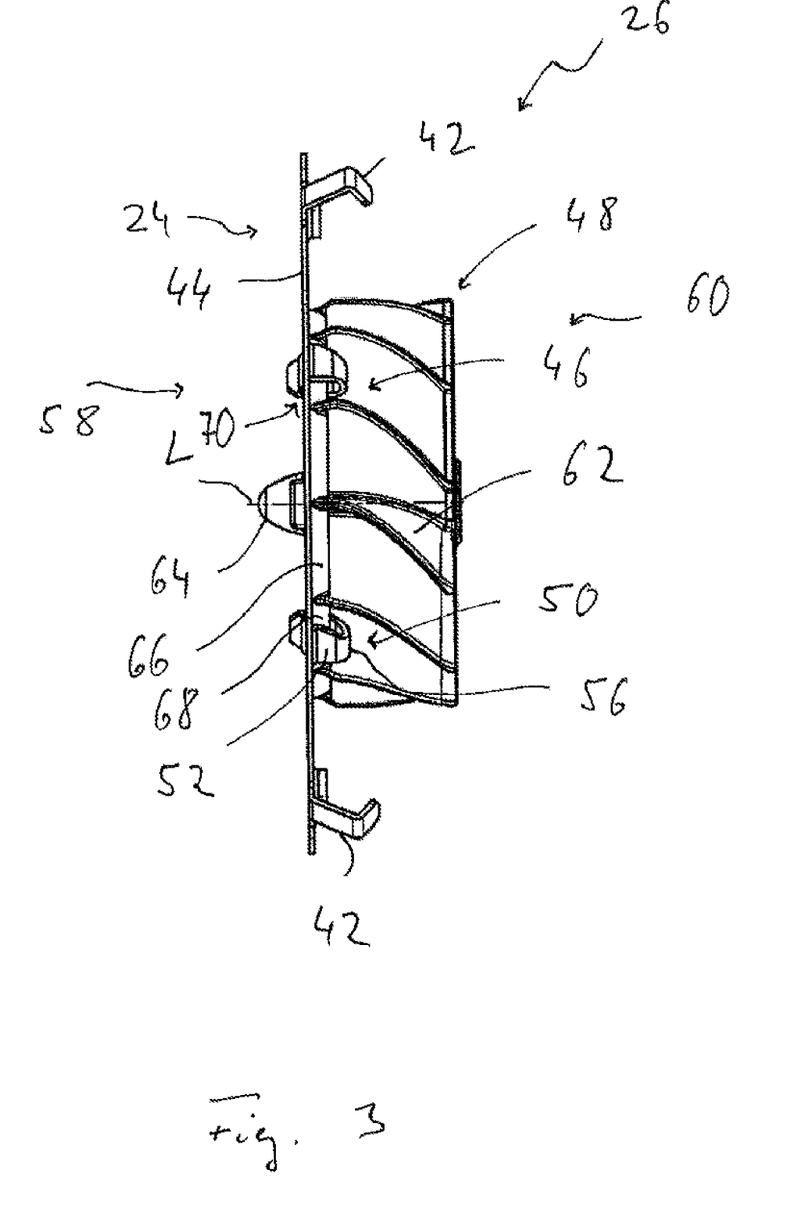
FIG. 3 is a lateral view of the mixer assembly unit according to FIG. 2.

Four counter-holding areas 46, at which a mixer body of the mixer assembly unit 26, which said mixer body is generally designated by 48, is secured, are provided at preferably circumferentially uniformly spaced locations in relation to one another in the exemplary embodiment shown at an inner circumferential area of a carrier element body of the carrier element 24, which carrier element body is generally designated by 44, and from which said carrier element body 44 the fixing straps 42 extend as well. Each of the counter-holding areas 46 comprises an inwards protruding, strap-like holding section 50, which can be clearly seen in FIG. 5. Each strap-like holding section 50 has an essentially U-shaped configuration and has an outer U-leg 52, an inner U-leg 54 as well as a connection area 56 connecting those. The U-shaped holding sections 50 are shaped such that the holding sections 50 are open in the direction of an incoming flow side 58 of the mixer body 48, which incoming flow side can be seen in FIG. 3, i.e., in the upstream direction, and are closed, especially by the connection area 56, towards an outflow side 60 of the mixer body 48, which outflow side is hidden in FIG. 2, i.e., in the downstream direction. Each of the holding sections 50 has an essentially hook-shaped configuration and thus makes it possible to hold the mixer body 48 at the carrier element 24 in a stable manner. The U-leg 52 now extends starting from the carrier element body 44 essentially in the direction of a mixer longitudinal axis L and in the direction of the outflow side 60 of the mixer body 48, while the U-leg 54 extends beginning from the connection area 56 essentially parallel to the U-leg 52 in the direction of the incoming flow side 58 of the mixer body 48.

The mixer body 48 comprises a plurality of blade-like flow deflection elements 62, which follow each other in the circumferential direction and extend, for example, essentially radially in relation to the mixer longitudinal axis L.

These flow deflection elements start from a central body area 64 of the mixer body 48 and extend radially outwards to a ring shaped connection area 66 preferably adjoining the flow deflection elements 62 on the incoming flow side 58. The mixer body 48 may be provided as an integral component, for example, as a cast metal component, with the central body area 64, with the blade-like flow deflection elements 62 and with the ring shaped connection area 66.

Figures 4, 5:
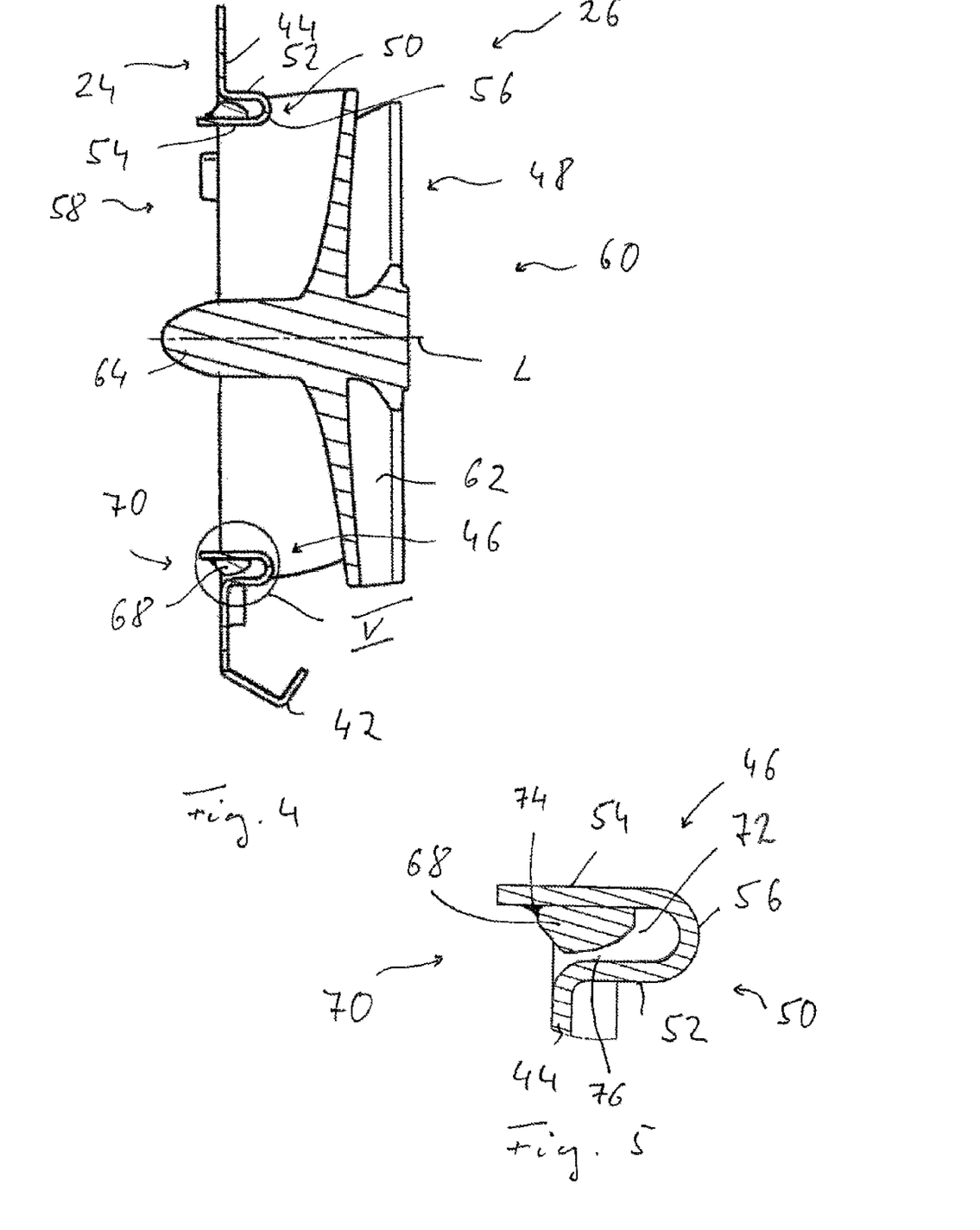
FIG. 4 is a longitudinal sectional view of the mixer assembly unit according to FIG. 2.
FIG. 5 is an enlarged view of detail V in FIG. 4.

In its areas extending between the flow deflection elements 62 following each other directly in circumferential directions and connecting the flow deflection elements to one another, the ring shaped connection area 66 provides respective holding areas 70 configured in the form of a holding web 68 for interaction with a respective counter-holding area 46 of the carrier element 24. These holding areas 70, configured as holding webs 68, can be inserted, as is shown in FIG. 5, into a holding area receiving space 72 provided by U-shaped holding sections 50 of the counter-holding areas 46, so that the holding sections 50 extend, on the one hand, from radially outwards to radially inwards over the holding areas 70 interacting with these in relation to the mixer longitudinal axis L and they extend axially over the holding areas 70 with the inner U-legs 54 also in the direction of the mixer longitudinal axis L. The holding webs 68, which are thus located within the holding area receiving spaces 72 in at least some areas, thus cannot move out of the holding sections 50 in the direction of the outflow side 60 of the mixer body 48, i.e., they are secured against excessive axial motion, and they are essentially also centered radially due to interaction with the inner U-legs 54. A defined positioning of the mixer body 48 in relation to the carrier element 24 is thus predefined, and compensation of manufacturing tolerances is made possible based on the holding sections 50 being configured as straps, which can be brought into their desired shape by forming sheet metal material and which also have a certain flexibility.

The mixer body 48 is permanently connected to the carrier element 24 in the area of the holding webs 68 or the holding sections 50 by connection in substance, especially by welding 74. This welding preferably establishes a connection between the holding webs 68 and the inner U-legs 54, and also preferably provides for a uniformly stable fixation over the circumference in each of the four counter-holding areas 46 at which the mixer body 48 is connected in substance by welding with the carrier element 24. It would nevertheless be possible to provide counter-holding areas 46 that can only be used for securing against an excessive axial motion but not for establishing a connection in substance. Further, counter-holding areas and holding areas can be provided that are used only to establish the connection in substance and in which the counter-holding areas do not necessarily have to extend radially over the holding areas.

It is further seen in FIG. 5 that an intermediate space 76 is formed between the outer U-leg 52 and the holding web 68. The mixer assembly unit 26 is heated in the exhaust gas stream and the mixer body 48, which is made of, for example, a cast metal material, will undergo a greater thermal expansion than the carrier element 24, which is made, in general, in the form of a shaped sheet metal part. Sufficient space, in which the mixer body can expand radially without coming into contact with the outer U-leg 52, is created for this thermal expansion of the mixer body 48, especially of the ring shaped connection area 66 thereof, by providing the intermediate space 76. The ring shaped connection area 66 can also pull the inner U-leg or inner U-legs 54 connected to it by the welds 74 radially outwards during this radial expansion, which is possible without generating stresses representing an excessive load for the welds 74 based on the circumstance that the carrier element 24 is configured with a comparatively high flexibility in the area of its U-shaped counter-holding areas 46 and based on the circumstance that the inner U-legs 54 have a greater axial extension than the outer U-legs 52.

The mixer assembly unit 26 is subject to a comparatively high mechanical load during the operation, especially due to the vibrations occurring in a vehicle and to the high temperatures in the exhaust system 10. This may lead to damage to the connection in substance under unfavorable circumstances, so that the mixer body 48 could separate from the carrier element 24 in an extreme case. Since the mixer body 48 is held, due to the interaction of the holding areas 70 with the counter-holding areas 46, against separation from the carrier element 24 in the downstream direction, i.e., in the direction of the flow guide element 16 and the catalytic converter device 28, there is no risk that the mixer body 48, whose external dimension, for example, the external diameter, will not, in general, at least be greater than the internal dimension, i.e., for example, the internal diameter, of the exhaust gas guide element 16, could move in such a state into this exhaust gas guide element 16 and to the catalytic converter device 28. Even though clattering noises may occur after the separation of the mixer body 48 from the carrier element 24, which occurs in case of a failure of the connection in substance, damage to downstream system areas is avoided. The mixer assembly unit 26 can thus be removed after uncoupling the two exhaust gas guide elements 14, 16 from one another and be replaced with a new one.

SUMMARY

An object of the present invention is to provide a mixer assembly unit that guarantees efficient mixing of exhaust gas and reactant and is secured against separation from the exhaust system as well as an exhaust system containing such a mixer assembly unit.

This object is accomplished according to the present invention by an exhaust system, especially for an internal combustion engine of a vehicle, comprising a mixer assembly unit with a mixer body with an incoming flow side and with an outflow side and with a plate shaped carrier element with a carrier element body arranged radially outwards in relation to the mixer body relative to a mixer longitudinal axis, wherein the mixer body comprises a plurality of flow deflection elements and at least one holding area, wherein the carrier element comprises a counter-holding area in association with at least one holding area, wherein at least one counter-holding area is connected in substance to a holding area, and wherein at least one counter-holding area extends at least partially radially over a holding area on a side oriented in the direction of the outflow side of the mixer body, wherein the mixer assembly unit is arranged in a junction area in which two, for example, tubular exhaust gas guide elements, adjoin each other, wherein each of the exhaust gas guide elements comprises in the junction area a flange shaped coupling section for coupling with the coupling section of the respective other exhaust gas guide element, wherein the carrier element body of the mixer assembly unit is arranged between the flange shaped coupling sections of the exhaust gas guide elements, and wherein a coupling element is provided, which encloses the flange shaped coupling sections radially outwards in at least some areas and extends radially inwards on the axial sides of the coupling sections, which axial sides are oriented facing away from one another.

Not only a reliable holding of the mixer body at the carrier element, but also an easy-to-embody, stable and especially also gas-tight integration of the carrier element between two exhaust gas-carrying components of an exhaust system is guaranteed with the configuration according to the present invention of an exhaust system.

It is also proposed for this purpose, in particular, that the axial sides of the flange shaped coupling sections, which sides are oriented facing away from one another, extend radially outwards towards one another, and that the coupling element have a radially outwards tapering receiving space for the flange shaped coupling sections.

To make it possible to achieve an essentially uniform holding interaction between the carrier element and the mixer body over the entire circumference in the mixer assembly unit according to the present invention, it is proposed that a plurality of counter-holding areas extending radially inwards at circumferentially spaced locations from one another be provided at the carrier element body.

To obtain a configuration that can be embodied in a simple and cost-effective manner and which meets the thermal requirements associated with an exhaust system, the carrier element may be configured as a shaped sheet metal part.

It is proposed for a further improvement of the holding interaction between the carrier element and the mixer body that at least one counter-holding area extend at least partially axially over an associated holding area.

To secure the mixer body against excessive radial movement, provisions may be made for at least one counter-holding area to extend axially radially inwards over the associated holding area.

In a configuration that guarantees a stable and secure holding and at the same time also permits tolerance compensation, at least one counter-holding area may comprise an essentially U-shaped holding section with two U-legs and a connection area connecting these, the U-leg and the connection area bordering a holding area receiving space that is open essentially in the direction of the incoming flow side of the mixer body. Since the holding area receiving space is open in the direction of the incoming flow side, it is not open in the direction of the outflow side against an outlet of the holding area of the mixer body, which holding area is received therein, so that movement of the mixer body is not possible in the downstream direction from the holding area receiving space even in case of failure of the connection in substance.

To make it possible to guarantee a stable connection over a long service life, especially taking into account different thermal expansions of the mixer body, on the one hand, and of the carrier element, on the other hand, it is further proposed that one of the U-legs be arranged radially outwards in relation to a holding area arranged in the holding area receiving space, that one of the U-legs be arranged radially inwards in relation to the holding area arranged in the holding area receiving space, and that the holding area be connected to the U-leg arranged radially inwards in relation to this or and that an intermediate space be provided between the holding area and the U-leg arranged radially outwards in relation to this.

If the mixer body is connected in substance to the carrier element in the area of at least one and preferably each counter-holding area extending radially over a holding area, both connection in substance and positive-locking connection can be embodied in these mutually interacting holding areas or counter-holding areas, and an efficient utilization of the holding areas and counter-holding areas provided can thus be guaranteed.

To make it possible to embody a stable configuration that does not essentially compromise the flow guiding in the area of the mixer body, it is proposed that at least one holding area adjoin a radially outer area of at least one flow deflection element. In particular, provisions may be made in this connection for at least one holding area to comprise a holding web connecting two flow deflection elements to one another.

It is proposed for a symmetrical configuration, which is especially advantageous concerning the flow guiding, that at least some of the flow deflection elements and preferably all flow deflection elements be arranged following one another in the circumferential direction and that a ring shaped connection area, which provides at least one holding web and connects these flow deflection elements to one another, be provided at a radially outer area of at least some and preferably all flow deflection elements. If the mixer body is configured, for example, as a cast metal component, the connection area may be made integral with the flow deflection elements connected by these.

According to another aspect of the present invention, the object mentioned in the introduction is accomplished by a mixer assembly unit, especially for an exhaust system of an internal combustion engine of a vehicle, comprising a mixer body with an incoming flow side and with an outflow side and a carrier element with a ring shaped carrier element body, which is arranged radially outwards in relation to the mixer body relative to the mixer longitudinal axis and which carrier element body encloses this mixer body radially outwards, wherein the mixer body comprises a plurality of flow deflection elements and at least one holding area, wherein the carrier element comprises a counter-holding element in association with at least one holding area, wherein at least one counter-holding area is connected in substance to a holding area, wherein at least one counter-holding area extends radially at least partially over a holding area on a side oriented in the direction of the outflow side of the mixer body, wherein the ring shaped carrier element body is arranged on the side of the at least one holding area, which side is oriented in the direction of the outflow side of the mixer body.

Stable holding of a mixer body, which holding is secure against complete separation from the carrier element, is guaranteed with an especially axially very compact configuration with a mixer assembly unit having such a configuration.

It is proposed for a holding acting essentially uniformly over the circumference that a plurality of counter-holding areas extending radially inwards at circumferentially spaced locations from one another be provided on the carrier element body.

Increased security against separation of the mixer body can further be guaranteed by at least one counter-holding area extending axially at least partially over an associated holding area, wherein provisions may especially preferably be made for at least one counter-holding area to extend axially radially inwards over the associated holding area.

The configuration, which is compact above all axially, can be supported by at least one counter-holding area having a first leg extending radially over the associated holding area on its side oriented in the direction of the outflow side of the mixer body and a second leg adjoining the first leg and extending axially radially inwards over the associated holding area.

Provisions may be made for this in an embodiment according to the present invention, which can be embodied in a structurally very simple manner, for the first leg to extend radially inwards starting from the ring shaped carrier element body.

In an alternative embodiment, the first leg may extend radially inwards starting from a third leg, the third leg extending in an extension direction opposite the extension direction of the second leg and with a radial offset in relation to the second leg starting from the first leg. Provisions may be made for this purpose, in particular, for the third leg to extend essentially axially in the direction of the second leg starting from the ring shaped carrier element body.

It is proposed for a stable fixation of the carrier element at an exhaust gas-carrying component of an exhaust system that at least one and preferably a plurality of holding projections extending essentially radially outwards be provided at the ring shaped carrier element body for holding the carrier element body at a tubular exhaust gas-carrying element.

At least one holding projection may extend a first leg radially here for a configuration of the carrier element, which configuration is stable per se.

The ring shaped carrier element body may have, e.g., a ring disk-shaped configuration, which means in the sense of the present invention that its axial thickness is at least not greater or is not substantially greater than the radial cross-sectional dimension or the material thickness of the carrier element body. As an alternative, the ring shaped carrier element body may have a tubular configuration.

The present invention further pertains to an exhaust system, especially for an internal combustion engine of a vehicle, comprising an above-described mixer assembly unit.

In this exhaust system, a tubular exhaust gas guide element may have, in association with the at least one holding projection, a holding recess, which is open in the tubular exhaust gas guide element to an axial end and receives the holding projection, and, adjoining axially the at least one holding projection received in a holding recess, a flange shaped coupling section enclosing the tubular exhaust gas guide element in a ring shaped manner may be provided.

Stable and also gas-tight holding of the carrier element can be achieved by the flange shaped coupling section being fixed together with the at least one holding projection on the tubular exhaust gas-carrying element by welding.

The present invention will be described below in detail with reference to the attached figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 6:
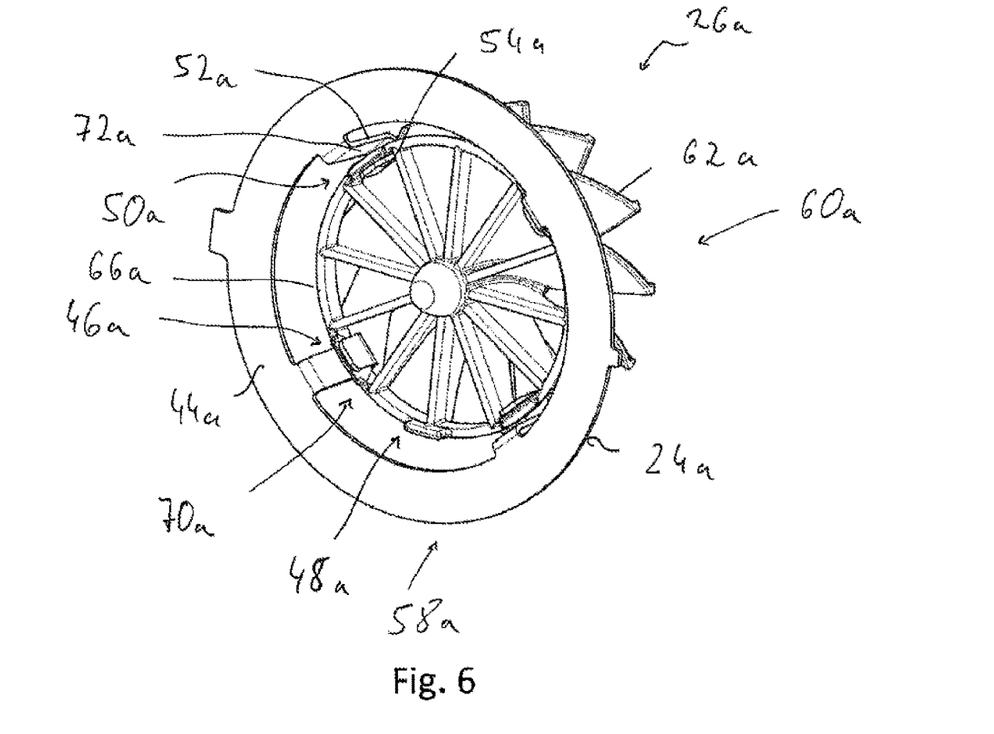
FIG. 6 is a perspective view of an embodiment of a mixer assembly unit configured according to the present invention.
Figure 7:
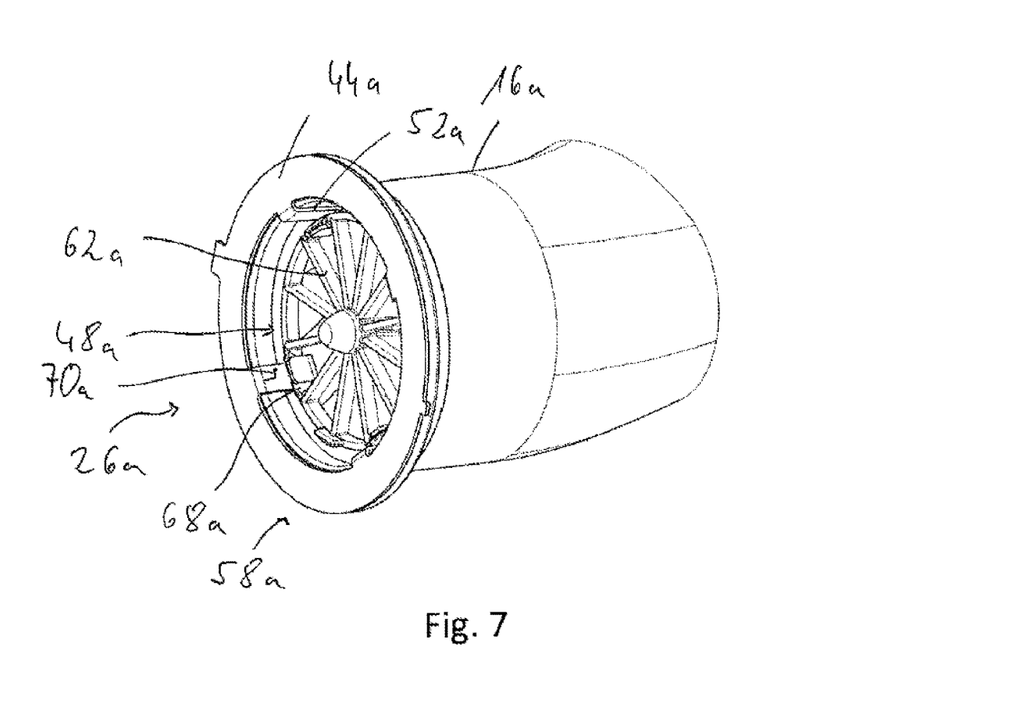
FIG. 7 is a perspective view of the mixer assembly unit according to FIG. 6 in conjunction with a tubular exhaust gas guide element.
Figure 8:
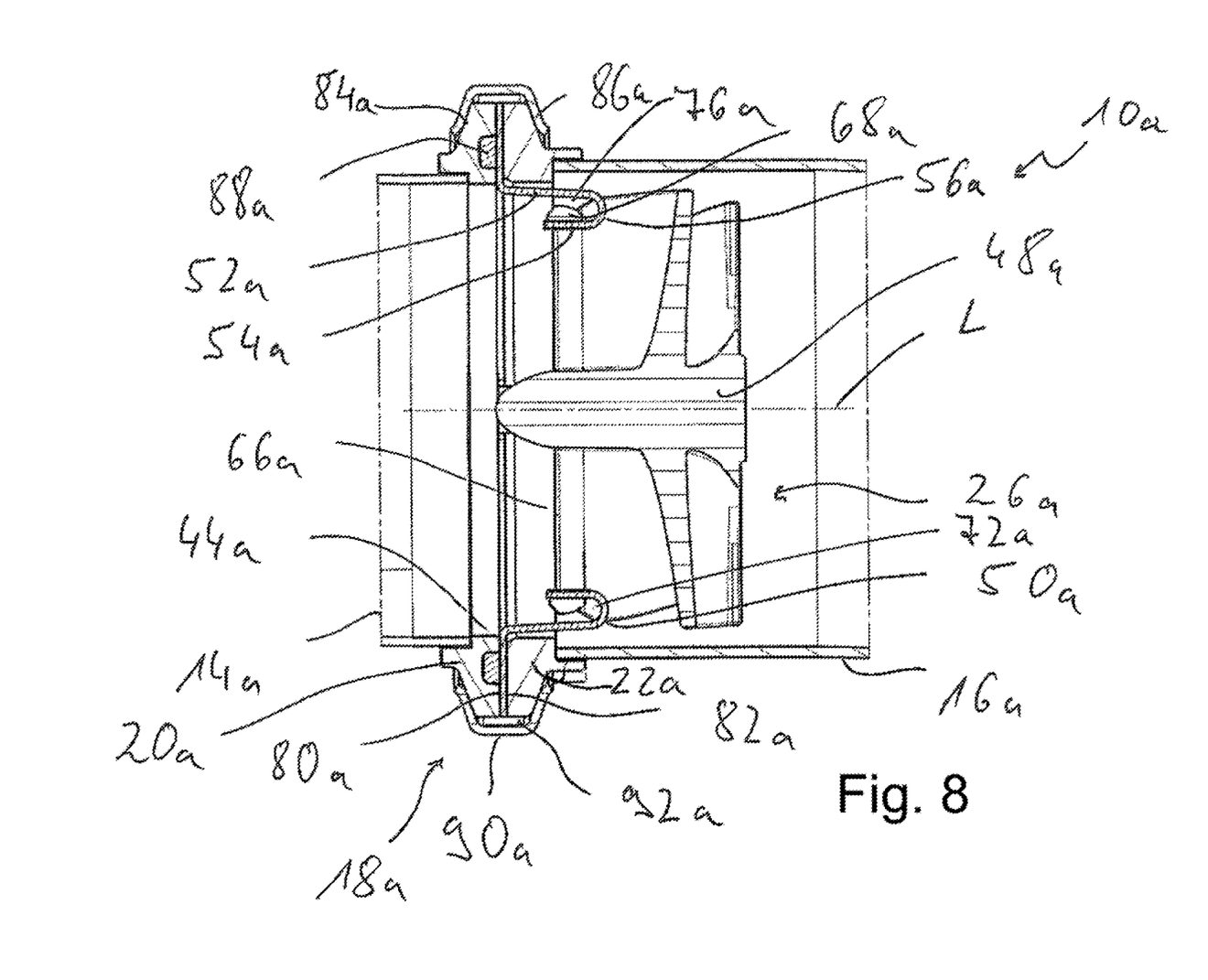
FIG. 8 is a sectional view of an exhaust system containing the mixer assembly unit according to FIG. 6.

Referring to FIGS. 6-8, an embodiment of an exhaust system configured according to the present invention will be described below, in which the mixer assembly unit provided in conjunction with two tubular exhaust gas guide elements. This is similar to the overall configuration of the embodiment described above with reference to FIGS. 2-5.

In conjunction with the exhaust system described with reference to FIGS. 6-8, the same reference numbers will be used for identical components and assembly units as with reference to FIGS. 1-5, but with the suffix "a" added. FIGS. 6-8 show the integration of the mixer assembly unit 26a into the junction area in which two tubular exhaust gas guide elements 14a, 16a adjoin one another. The exhaust gas guide element 14a may be, for example, a tube leading away from an upstream system area, e.g., from a particle filter, of the exhaust system 10a or a pipe fitting, while the tubular exhaust gas guide component 16a may be, for example, a front pipe leading to a catalytic converter positioned farther downstream or to another assembly unit.

A flange shaped coupling section 20a, 22a having a ring shaped configuration is fixed, for example, by welding at each of the two tubular exhaust gas guide elements 14a, 16a. The two flange shaped coupling sections 20a, 22a have support surfaces 80a, 82a, which are to be positioned facing one another and receive between them the carrier element body 44a having a plate shaped configuration and which may be oriented essentially at right angles to the longitudinal axis of the respective exhaust gas guide elements 14a, 16a and also at right angles to the mixer longitudinal axis L. The coupling sections 20a, 22a are shaped on their axial sides 84a, 86a oriented facing away from one another such that these axial sides 84a, 86a extend radially outwards towards one another, so that the two coupling sections 20a, 22a supported on one another via the carrier element body 44a will have a structure tapering, on the whole, radially outwards. A sealing element 88a, which is, for example, O-ring shaped, is provided at least in interaction with one of the coupling sections 20a, 22a, here with the coupling section 20a, and is received in a corresponding groove-like depression in order to increase the security against an unintended discharge of gas. A corresponding sealing element could also be used in conjunction with the other coupling section 22a.

To guarantee bonding in a stable manner, a coupling element 90a is provided, which extends around the two coupling sections 20a, 22a radially outwards in at least some areas. The shape of the coupling element 90a is adapted to the outwards tapering structure of the two coupling sections 20a, 22a supported against one another, so that the coupling element 90a comprises a radially outwards tapering receiving space 92a for the two coupling sections 20a, 22a. The coupling element thus has an approximately V-shaped cross-sectional structure, which ensures that the two coupling sections 20a, 22a are pressed axially against one another and are thus held at one another in a stable and gas-tight manner in case of a bracing of the coupling element 90a in the circumferential direction and hence also in case of a radially inwards directed action on the two coupling sections. To achieve this, the coupling element may be configured with a plurality of segments, which follow one another in the circumferential direction and are connected to one another, for example, in an articulated manner, wherein a tensioning element, e.g., a tensioning screw or the like, may be provided between two of these segments.

With this arrangement, the mixer assembly unit 26a is held firmly in the area of its carrier element body 44a between the two coupling sections 20a, 22a. Since the holding sections 50a carrying the mixer body 48a, especially the radially outer U-legs 52a, extend axially farther in relation to the mixer body 48a in this embodiment of the mixer assembly unit 26a than in the embodiment shown in FIGS. 2-5, the mixer body 48a, which is positioned essentially axially offset in relation to the carrier element body 44a, is thus located fully within the exhaust gas guide element 16a.

Figure 9:
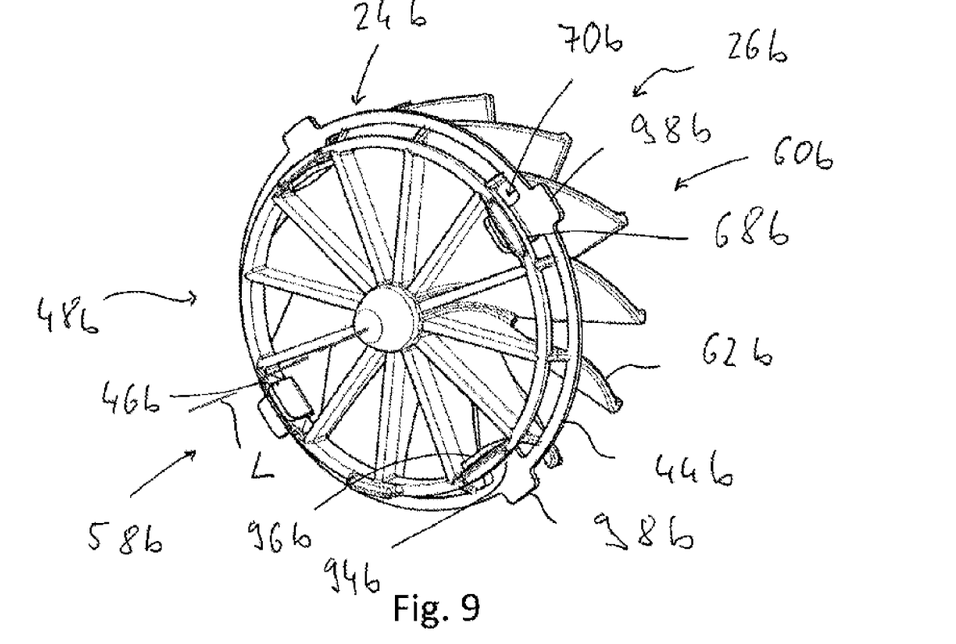
FIG. 9 is a perspective view of an alternative embodiment of a mixer assembly unit according to the present invention.
Figure 10:
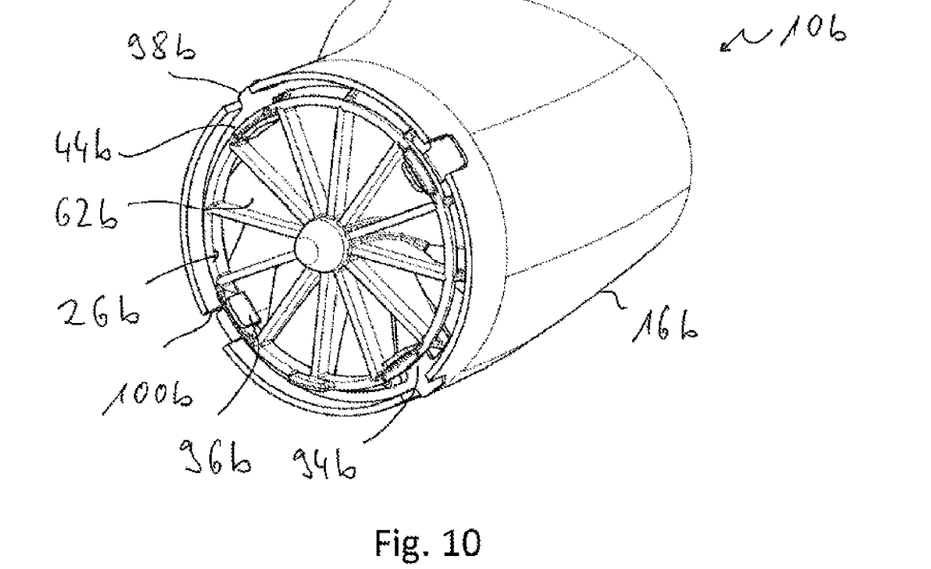
FIG. 10 is a perspective view of the mixer assembly unit according to FIG. 9 in conjunction with a tubular exhaust gas guide element.

FIGS. 9 and 10 show an alternative embodiment of a mixer assembly unit and an alternative type of integration of the mixer assembly unit in an exhaust system or in a tubular exhaust gas guide element thereof. Assembly units or components that correspond to the above-described assembly units or components in terms of configuration and function are designated by the same reference number with the suffix "b" added.

There is a substantial structural difference in the embodiment shown in FIGS. 9 and 10 in that the ring shaped carrier element body 44b is oriented in relation to the mixer body 48b such that it is positioned on the side of the holding areas 70b formed at the mixer body 48b that is oriented in the direction of the outflow side 60b of the mixer body 48b. The carrier element 24b has, starting from the ring shaped carrier element body 44b, first legs 94b extending radially inwards. These extend over the holding areas 70b formed at the mixer body 48b in the radial direction and thus provide respective counter-holding areas 46b, at which the mixer body 48b can be supported in the axial direction.

Essentially axially extending second legs 96b, which extend axially at least partially over the holding webs 68b and the holding areas 70b on their radial inner side, adjoin the approximately radially extending first legs 94b radially within the holding areas 70b and the holding webs 68b of the mixer body 48b, which said holding webs provide said holding areas 70b. The mixer body 48b is connected to these second legs 96b or/and to the first legs 94b in the area of its holding webs 68b, for example, by welding. A permanent and defined positioning of the mixer body 48b in relation to the carrier element 24b is guaranteed in this manner. Should this permanent connection be destroyed, the counter-holding areas 46b extending radially and axially over the mixer body 48b prevent an unintended movement of the mixer body 48b in the direction of a component of the exhaust system 10b, which component is positioned downstream.

In the circumferential areas in which the first legs 94b adjoin the carrier element body 44b, holding projections 98b that extend the first legs 94b essentially radially extend from the carrier element body 44b. In association with these holding projections 98b, holding recesses 100b that are axially open towards the axial end of the exhaust gas guide element 16b may be provided at a tubular exhaust gas guide element 16b receiving the mixer assembly unit 26b. When the mixer assembly unit 26b is axially inserted into the exhaust gas guide element 16b, the holding projections 98b enter into the holding recesses 100b and thus ensure a defined axial support and also a circumferential holding of the mixer assembly unit 26b at the exhaust gas guide element 16b. A ring shaped coupling section, as it is shown, for example, in the form of the coupling section 22a in FIG. 8, can subsequently be pushed over the axial end of the tubular exhaust gas guide element 16b and fixed thereto by welding. The holding projections 98b meshing with the holding recesses 100b radially outwards can also be fixed in the process on the exhaust gas guide element 16b and on the coupling section fixed thereto, and the holding recesses 100b can be closed in a gas-tight manner.

The configuration shown in FIGS. 9 and 10 has an axially compact size, because the carrier element 24b is arranged essentially entirely in the axial extension area of the mixer body 48b. The ring shaped carrier element body 44b is dimensioned such that it can be accommodated in the interior of the tubular exhaust gas guide element 16b. The ring shaped carrier element body 44b has a comparatively small radial extension for this purpose in order to bring about the smallest possible flow contraction. For example, the axial thickness of the ring shaped carrier element body 44b could also approximately correspond, when viewed in the cross section, to the radial dimension or be somewhat smaller or larger. A ring shaped carrier element body 44b dimensioned in this manner is considered to be ring disk-shaped in the sense of the present invention.

Figure 11:
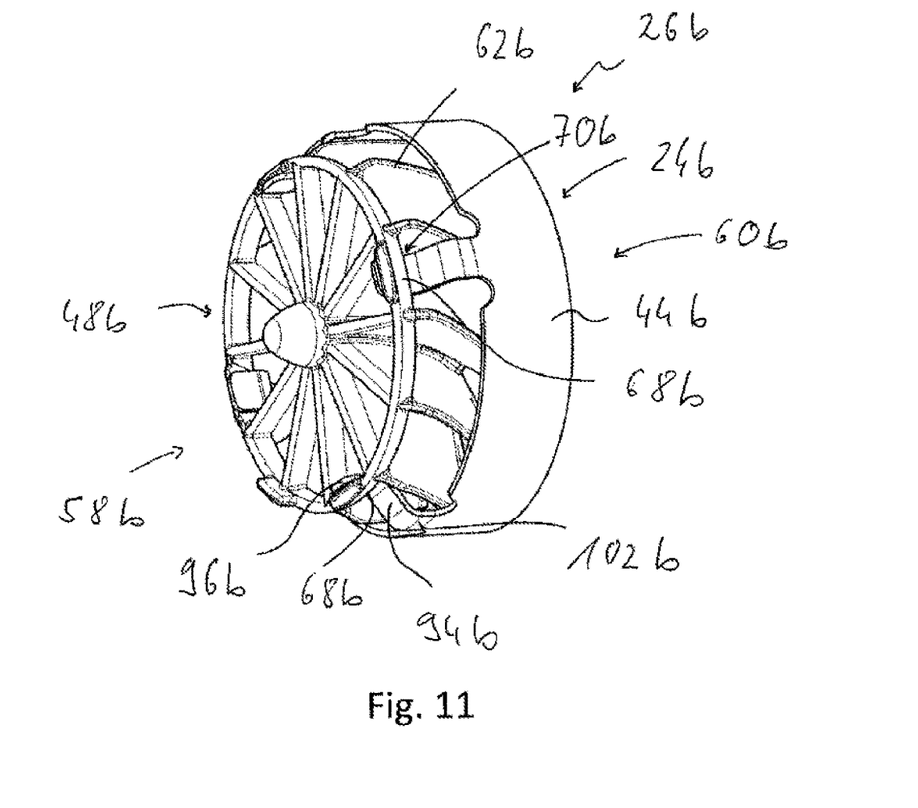
FIG. 11 is a perspective view of a perspective view of an alternative embodiment of a mixer assembly unit according to the present invention.
Figure 12:
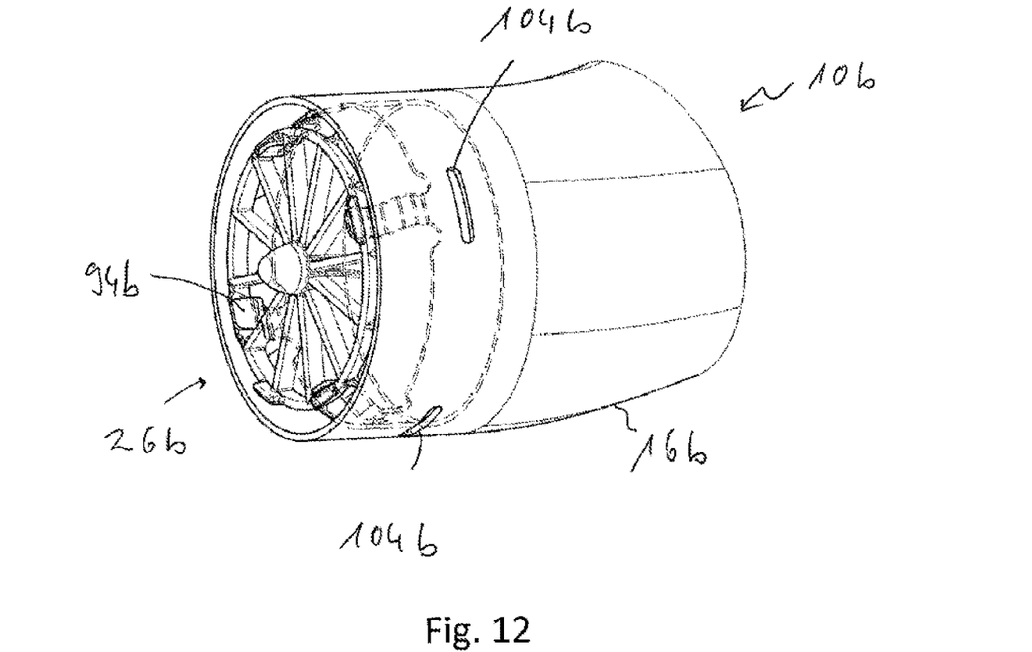
FIG. 12 is a perspective view of a tubular exhaust gas guide element of an exhaust system with a mixer assembly unit shown in FIG. 11.
Figure 13:
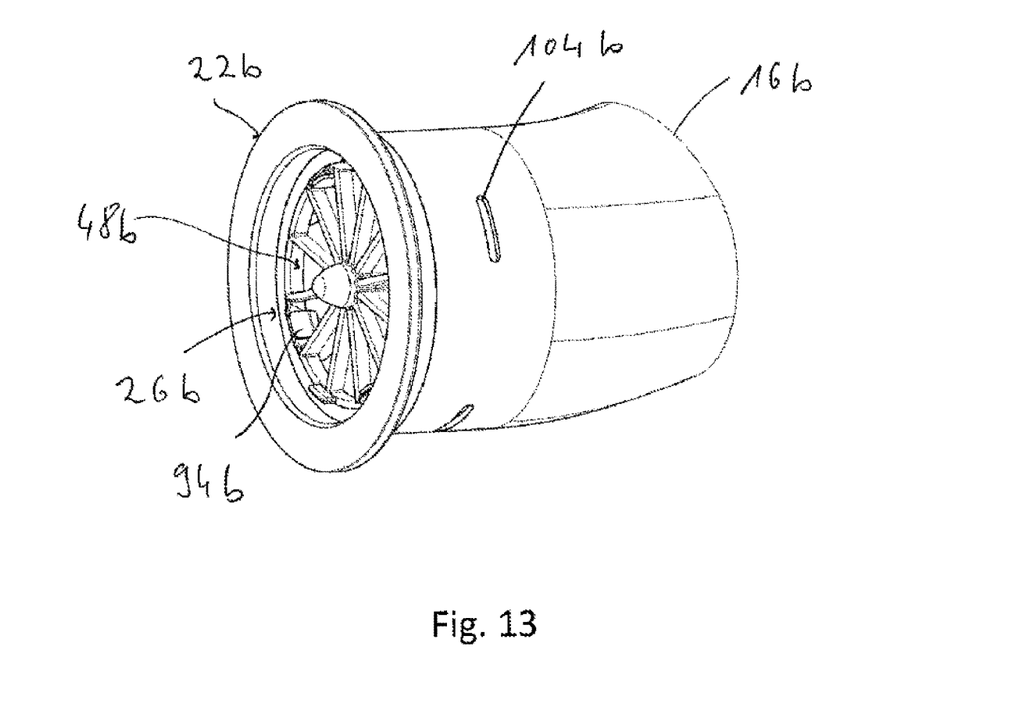
FIG. 13 is a perspective view of the exhaust gas guide element according to FIG. 12 with a flange shaped coupling section arranged thereon.

FIGS. 11-13 show an embodiment variant, in which the ring shaped carrier element body 44b is likewise arranged on the side of the holding area 70b of the mixer body 48b, which side is oriented in the direction of the outflow side 60b. The counter-holding areas 46b in turn comprise the first legs 94b, with which these extend over the holding areas 70b at the mixer element body 48b radially inwards, as well as the second legs 96b, which extend from the first legs 94b approximately in the direction of the mixer longitudinal axis L and extend at least partially over the holding areas 70b in at least some areas on the radial inner side of the holding areas. The carrier element body 44b has in this embodiment an essentially cylindrical structure and it thus has a substantially greater extension in the axial direction than in the radial direction, wherein the radial wall thickness is being considered here. To connect the first legs 94b to this essentially cylindrical or tubular, ring shaped mixer body 48b, third legs 102b are provided, which, starting from the ring shaped and tubular or cylindrical carrier element body 44b, extend essentially axially. The counter-holding areas 46b thus have a structure in which the first legs 94b extend from the radially outer to the radially inner direction, for example, with a radial extension or set obliquely, and the second as well as third legs 96b, 102b extend, starting from their connection to the respective first leg 94b, radially offset in relation to one another in opposite axial direction.

The mixer body 48*b* is connected in the area of its holding areas 70*b* and of the holding webs 68*b* providing these to the counter-holding areas 46*b*, for example, in the area of the second legs 96*b* or/and of the first legs 94*b* by welding.

FIGS. 12 and 13 show the integration of a mixer assembly unit 26*b* having such a configuration into a tubular exhaust gas guide element 16*b*. The mixer body 48*b* is inserted into the axial end of the tubular exhaust gas guide element 16*b* until it comes to lie in an axial area, in which, for example, slot-like openings 104*b* are provided in the tubular exhaust gas guide element 16*b*. The carrier element body 44*b* can be permanently connected by welding to the exhaust gas guide element 16*b* in the area of these slot-like openings 104*b* from the outside, and the openings 104*b* are also closed in a gas-tight manner at the same time. Furthermore, a flange shaped coupling section 22*b* having a ring shaped configuration, which is shown in FIG. 13, can then be pushed over the axial end of the tubular exhaust gas guide element 16*b* and fixed thereto by welding, so that the exhaust gas guide element 16*b* containing the mixer assembly unit 26*b* can then be connected to another tubular exhaust gas guide element led in from the upstream direction, for example, with the use of a coupling element, as it was already described with reference to FIG. 8.

While specific embodiments of the invention have been shown and described in detail to illustrate the application of the principles of the invention, it will be understood that the invention may be embodied otherwise without departing from such principles.

What is claimed is:

1. An exhaust system comprising:
a first exhaust gas guide element;
a second tubular exhaust gas guide element;
a mixer assembly unit comprising: a mixer body comprising a plurality of flow deflection elements and at least one holding area, the mixer body having an incoming flow side and an outflow side; and a carrier element with a carrier element body arranged radially outwards in relation to the mixer body relative to a mixer longitudinal axis, the carrier element comprising, in association with the at least one holding area, a counter-holding area and the at least one counter-holding area is connected in substance to the at least one holding area and the at least one counter-holding area extends radially at least partially over the at least one holding area on a side oriented in a direction of the outflow side of the mixer body; and
a coupling element, wherein:
the mixer assembly unit is arranged in a junction area in which the first tubular exhaust gas guide element and the second tubular exhaust gas guide element adjoin one another;
each of the first tubular exhaust gas guide element and the second tubular exhaust gas guide element comprise, in the junction area, a flange shaped coupling section for coupling with the flange shaped coupling section of the respective other exhaust gas guide element;
the carrier element body of the mixer assembly unit is arranged between the flange shaped coupling sections of the of the first tubular exhaust gas guide element and the second tubular exhaust gas guide element; and
the coupling element encloses the flange shaped coupling sections in at least some areas radially outwards and extends over the flange shaped coupling sections on axial sides thereof oriented facing away from one another radially inwards;

wherein:
the at least one counter-holding area extends axially over an associated holding area at least partially radially inwards in relation to the associated holding area;
the at least one counter-holding area comprises an U-shaped holding section with two U-legs and a connection area connecting the two U-legs, the U-legs and the connection area bordering a holding area receiving space, which is open in the direction of the incoming flow side of the mixer body, one of the two U-legs being arranged radially outwards in relation to a holding area arranged in the holding area receiving space and one of the U-legs being arranged radially inwards in relation to the holding area arranged in the holding area receiving space, the holding area being connected to the U-leg arranged radially inwards in relation to the holding area.

2. The exhaust system in accordance with claim 1, wherein:
axial sides of the flange shaped coupling sections, which sides are oriented facing away from one another, extend towards one another radially outwards; and
the coupling element has a radially outwards tapering receiving space for the flange shaped coupling sections.

3. The exhaust system in accordance with claim 1, wherein:
the carrier element body has a ring shaped configuration; or
the at least one counter-holding area comprises a plurality of counter-holding areas extending radially inwards at circumferentially spaced locations from one another are provided on the carrier element body; or
the carrier element is configured as a shaped sheet metal component; or
any combination of the carrier element body has a ring shaped configuration, and the at least one counter-holding area comprises a plurality of counter-holding areas extending radially inwards at circumferentially spaced locations from one another are provided on the carrier element body, and the carrier element is configured as a shaped sheet metal component.

4. The exhaust system in accordance with claim 1, wherein:
an intermediate space is provided between the holding area and the U-leg arranged radially outwards in relation to the holding area or the holding area.

5. The exhaust system in accordance with claim 1, wherein the mixer body is connected in substance to the carrier element in the area of the at least one counter-holding area extending radially over a holding area.

6. The exhaust system in accordance with claim 1, wherein the at least one holding area adjoins a radially outer area of at least one flow deflection element and the at least one holding area comprises a holding web connecting two flow deflection elements to one another.

7. The exhaust system in accordance with claim 6, wherein:
at least some of the flow deflection elements are arranged following one another in a circumferential direction; and
the mixer body comprises a ring shaped connection area, which connects the flow deflection elements to one another and provides at least one holding web at a radially outer area of the flow deflection elements, the connection area being made integral with the flow deflection elements.

8. The exhaust system in accordance with claim 1, wherein:

the U-shape holdings section has an opening at a top of the U-shape directed in the direction of the incoming flow side of the mixer body.

9. A mixer assembly unit, especially for an exhaust system of an internal combustion engine of a vehicle, the mixer assembly unit comprising:
 a mixer body with an incoming flow side and with an outflow side, the mixer body comprising a plurality of flow deflection elements and at least one holding area; and
 a carrier element with a ring shaped carrier element body arranged radially outwards in relation to the mixer body relative to a mixer longitudinal axis, the carrier element comprising in association with the at least one holding area, at least one counter-holding area connected in substance to the at least one holding area, wherein the at least one counter-holding area extends radially over the at least one holding area in at least some areas on a side oriented in the direction of the outflow side of the mixer body and the ring shaped carrier element body is arranged on a side of the at least one holding area that is oriented in the direction of the outflow side of the mixer body;
 wherein the at least one counter-holding area extends axially at least partially over the at least one holding area radially inwards in relation to the at least one holding area.

10. The mixer assembly unit in accordance with claim 9, wherein a plurality of counter-holding areas extending radially inwards at circumferentially spaced locations from one another are provided at the carrier element body.

11. The mixer assembly unit in accordance with claim 9, wherein the at least one counter-holding area has a first leg extending radially over the at least one holding area on a side oriented in a direction of the outflow side of the mixer body and a second leg, which adjoins the first leg, extends axially over the the at least one holding area radially inwards.

12. The mixer assembly unit in accordance with claim 11, wherein:
 the first leg extends radially inwards starting from the ring shaped carrier element body; or
 the first leg extends radially inwards starting from a third leg, the third leg extending in an extension direction opposite an extension direction of the second leg and with a radial offset in relation to the second leg starting from the first leg.

13. The mixer assembly unit in accordance with claim 12, wherein the third leg extends essentially axially in a direction of the second leg starting from the ring shaped carrier element body.

14. The mixer assembly unit in accordance with claim 12, wherein:
 at least one holding projection extends essentially radially outwards at the ring shaped carrier element body for holding the carrier element body at a tubular exhaust gas guide element; and
 the at least one holding projection extends a first leg radially.

15. The mixer assembly unit in accordance with claim 9, wherein at least one holding projection extends essentially radially outwards at the ring shaped carrier element body for holding the carrier element body at a tubular exhaust gas guide element.

16. The mixer assembly unit in accordance with claim 9, wherein the ring shaped carrier element body has a ring disk shaped configuration or the ring shaped carrier element body has a tubular configuration.

17. An exhaust system, for an internal combustion engine of a vehicle, the exhaust system comprising a mixer assembly unit comprising:
 a mixer body with an incoming flow side and with an outflow side, the mixer body comprising a plurality of flow deflection elements and at least one holding area; and
 a carrier element with a ring shaped carrier element body arranged radially outwards in relation to the mixer body relative to a mixer longitudinal axis, the carrier element comprising in association with at least one holding area, at least one counter-holding area connected in substance to the at least one holding area, wherein the at least one counter-holding area extends radially over the at least one holding area in at least some areas on a side oriented in the direction of the outflow side of the mixer body and the ring shaped carrier element body is arranged on a side of the at least one holding area that is oriented in the direction of the outflow side of the mixer body;
 wherein the at least one counter-holding area extends axially at least partially over the at least one holding area radially inwards in relation to the at least one holding area.

18. The exhaust system in accordance with claim 17, further comprising a tubular exhaust gas guide element, wherein:
 at least one holding projection extends essentially radially outwards at the ring shaped carrier element body for holding the carrier element body at the tubular exhaust gas guide element;
 the tubular exhaust gas guide element has, in association with the at least one holding projection, a holding recess, which is open in the tubular exhaust gas guide element toward an axial end and accommodates the holding projection;
 a flange shaped coupling section encloses the tubular exhaust gas guide element annularly, axially adjoining the at least one holding projection accommodated in a holding recess.

19. The exhaust system in accordance with claim 18, wherein the flange shaped coupling section is fixed together with the at least one holding projection to the tubular exhaust gas guide element by welding.

* * * * *